US009661388B2

(12) United States Patent
Phillips et al.

(10) Patent No.: US 9,661,388 B2
(45) Date of Patent: *May 23, 2017

(54) RULES-BASED CONTENT MANAGEMENT

(71) Applicant: AT&T INTELLECTUAL PROPERTY I, LP, Atlanta, GA (US)

(72) Inventors: Debra Phillips, Austin, TX (US); Brian Wilson, Johnston, IA (US); Lorraine Leach, Sherman Oaks, CA (US); Thomas Scott Webster, Mystic, CT (US); Michelle Mayo, Helotes, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,572

(22) Filed: Dec. 14, 2015

(65) Prior Publication Data

US 2016/0112765 A1    Apr. 21, 2016

Related U.S. Application Data

(63) Continuation of application No. 13/488,495, filed on Jun. 5, 2012, now Pat. No. 9,247,209, which is a continuation of application No. 11/408,495, filed on Apr. 20, 2006, now Pat. No. 8,209,729.

(51) Int. Cl.
    *H04N 7/16*   (2011.01)
    *H04N 21/472*   (2011.01)
    (Continued)

(52) U.S. Cl.
    CPC ....... *H04N 21/47202* (2013.01); *G06Q 30/02* (2013.01); *H04N 7/17318* (2013.01);
    (Continued)

(58) Field of Classification Search
    CPC ................. H04N 21/83; H04N 21/835; H04N 21/83555; H04N 21/84; H04N 21/47202;
    (Continued)

(56) References Cited

U.S. PATENT DOCUMENTS 5,818,439 A    10/1998   Nagasaka et al.
5,872,588 A *   2/1999   Aras .................. H04N 7/17354
                                                             348/E7.075

(Continued)

OTHER PUBLICATIONS

"Extended European Search Report", EPO Application No. 07755569.6, Officer Suphi Umit Naci, Oct. 12, 2010, 6 pages.

(Continued)

*Primary Examiner* — An Son P Huynh
(74) *Attorney, Agent, or Firm* — Guntin & Gust, PLC; Matthew Tropper

(57) ABSTRACT

Techniques for rules-based content management are provided. Video on demand content is collected from a variety of sources. Business rules embedded within metadata can be retrieved where the business rules control processing and delivery of the video on demand content. The video on demand content may be selectively packaged in response to the business rules and the metadata to generate packaged video on demand content. A server can distribute the packaged video on demand content to devices. A priority for processing the packaged video on demand content can be based on a quality of service parameter and based on the metadata, the business rules, and a license embedded within the metadata where the license describes the priority. Other embodiments are disclosed.

20 Claims, 6 Drawing Sheets

(51) Int. Cl.

| | |
|---|---|
| *G06Q 30/02* | (2012.01) |
| *H04N 7/173* | (2011.01) |
| *H04N 21/258* | (2011.01) |
| *H04N 21/262* | (2011.01) |
| *H04N 21/2665* | (2011.01) |
| *H04N 21/61* | (2011.01) |
| *H04N 21/84* | (2011.01) |
| *H04N 21/231* | (2011.01) |
| *H04N 21/254* | (2011.01) |
| *H04N 21/458* | (2011.01) |
| *H04N 21/4627* | (2011.01) |
| *H04N 21/6405* | (2011.01) |

(52) U.S. Cl.
CPC ... *H04N 21/23113* (2013.01); *H04N 21/2541* (2013.01); *H04N 21/25891* (2013.01); *H04N 21/262* (2013.01); *H04N 21/2665* (2013.01); *H04N 21/458* (2013.01); *H04N 21/4627* (2013.01); *H04N 21/6125* (2013.01); *H04N 21/6405* (2013.01); *H04N 21/84* (2013.01)

(58) Field of Classification Search
CPC ......... H04N 21/23113; H04N 21/2541; H04N 21/25891; H04N 21/262; H04N 21/2665; H04N 21/458; H04N 21/4627; H04N 21/6125; H04N 21/6405; H04N 7/17318; G06Q 30/02

See application file for complete search history.

(56) References Cited

U.S. PATENT DOCUMENTS

| | | | |
|---|---|---|---|
| 5,903,673 A | 5/1999 | Wang | |
| 5,974,503 A | 10/1999 | Venkatesh et al. | |
| 6,006,257 A | 12/1999 | Slezak | |
| 6,144,375 A | 11/2000 | Jain et al. | |
| 6,154,771 A | 11/2000 | Rangan et al. | |
| 6,230,162 B1 | 5/2001 | Kumar et al. | |
| 6,298,482 B1* | 10/2001 | Seidman | H04N 5/44543 348/E5.105 |
| 6,345,361 B1 | 2/2002 | Jerger et al. | |
| 6,463,585 B1* | 10/2002 | Hendricks | H04H 20/10 348/E5.002 |
| 6,473,902 B1 | 10/2002 | Noritomi | |
| 6,530,082 B1* | 3/2003 | Del Sesto | H04H 20/38 348/E7.071 |
| 6,580,950 B1 | 6/2003 | Johnson et al. | |
| 6,604,140 B1 | 8/2003 | Beck et al. | |
| 6,625,750 B1* | 9/2003 | Duso | G06F 11/2028 714/11 |
| 6,725,281 B1 | 4/2004 | Zintel et al. | |
| 6,774,926 B1 | 8/2004 | Ellis | |
| 6,782,550 B1 | 8/2004 | Cao | |
| 6,868,292 B2 | 3/2005 | Ficco et al. | |
| 6,937,730 B1 | 8/2005 | Buxton | |
| 6,950,725 B2 | 9/2005 | Von Kannewurff et al. | |
| 6,968,364 B1 | 11/2005 | Wong | |
| 7,047,550 B1* | 5/2006 | Yasukawa | H04N 5/44543 348/E5.105 |
| 7,114,174 B1 | 9/2006 | Brooks et al. | |
| 7,130,908 B1 | 10/2006 | Pecus et al. | |
| 7,188,357 B1 | 3/2007 | Rieschl et al. | |
| 7,346,649 B1 | 3/2008 | Wong | |
| 7,404,201 B2 | 7/2008 | Takeuchi | |
| 7,434,242 B1 | 10/2008 | Goode | |
| 7,523,135 B2 | 4/2009 | Bradford et al. | |
| 7,788,686 B1 | 8/2010 | Andrews | |
| 7,904,931 B2 | 3/2011 | Frederickson et al. | |
| 7,986,686 B2 | 7/2011 | Nadeau et al. | |
| 2001/0014975 A1 | 8/2001 | Gordon et al. | |
| 2001/0036271 A1 | 11/2001 | Javed | |
| 2002/0007402 A1 | 1/2002 | Huston et al. | |
| 2002/0007494 A1 | 1/2002 | Hodge | |
| 2002/0019814 A1 | 2/2002 | Ganesan | |
| 2002/0023270 A1 | 2/2002 | Thomas et al. | |
| 2002/0049977 A1 | 4/2002 | Miller et al. | |
| 2002/0056087 A1* | 5/2002 | Berezowski | G06Q 30/02 725/9 |
| 2002/0059394 A1 | 5/2002 | Sanders | |
| 2002/0059623 A1 | 5/2002 | Rodriguez et al. | |
| 2002/0078174 A1 | 6/2002 | Sim et al. | |
| 2002/0087995 A1 | 7/2002 | Pedlow | |
| 2002/0104087 A1* | 8/2002 | Schaffer | H04N 7/163 725/46 |
| 2002/0111698 A1 | 8/2002 | Graziano et al. | |
| 2002/0112181 A1 | 8/2002 | Smith et al. | |
| 2002/0112239 A1* | 8/2002 | Goldman | H04H 60/39 725/46 |
| 2002/0124262 A1 | 9/2002 | Basso et al. | |
| 2002/0143565 A1 | 10/2002 | Headings et al. | |
| 2002/0143782 A1 | 10/2002 | Headings et al. | |
| 2002/0152318 A1 | 10/2002 | Menon et al. | |
| 2003/0018745 A1 | 1/2003 | McGowan | |
| 2003/0018978 A1 | 1/2003 | Singal et al. | |
| 2003/0037331 A1 | 2/2003 | Lee | |
| 2003/0084449 A1 | 5/2003 | Chane et al. | |
| 2003/0115585 A1* | 6/2003 | Barsness | H04H 60/64 725/9 |
| 2003/0204856 A1 | 10/2003 | Buxton | |
| 2003/0229898 A1 | 12/2003 | Babu et al. | |
| 2003/0233559 A1 | 12/2003 | Asano et al. | |
| 2004/0034868 A1 | 2/2004 | Fukuoka | |
| 2004/0054747 A1 | 3/2004 | Breh et al. | |
| 2004/0103120 A1 | 5/2004 | Fickle et al. | |
| 2004/0133923 A1* | 7/2004 | Watson | G06Q 30/06 725/134 |
| 2004/0136698 A1 | 7/2004 | Mock | |
| 2004/0148632 A1 | 7/2004 | Park | |
| 2004/0162846 A1 | 8/2004 | Nakahara et al. | |
| 2004/0170374 A1 | 9/2004 | Bender et al. | |
| 2004/0246376 A1 | 12/2004 | Sekiguchi et al. | |
| 2004/0255335 A1 | 12/2004 | Fickle et al. | |
| 2004/0268386 A1 | 12/2004 | Logan et al. | |
| 2005/0015591 A1 | 1/2005 | Thrash et al. | |
| 2005/0028206 A1 | 2/2005 | Cameron et al. | |
| 2005/0138110 A1 | 6/2005 | Redlich et al. | |
| 2005/0149964 A1* | 7/2005 | Thomas | G06Q 30/02 725/9 |
| 2005/0203970 A1 | 9/2005 | McKeown et al. | |
| 2005/0289618 A1 | 12/2005 | Hardin | |
| 2005/0289636 A1 | 12/2005 | Schiller | |
| 2006/0010470 A1* | 1/2006 | Kurosaki | H04H 20/76 725/46 |
| 2006/0085816 A1 | 4/2006 | Funk et al. | |
| 2006/0085826 A1 | 4/2006 | Funk et al. | |
| 2006/0123455 A1 | 6/2006 | Pai et al. | |
| 2006/0126556 A1 | 6/2006 | Jiang et al. | |
| 2006/0159117 A1 | 7/2006 | Furlong et al. | |
| 2006/0161635 A1 | 7/2006 | Lamkin et al. | |
| 2006/0242081 A1 | 10/2006 | Ivanov et al. | |
| 2007/0050834 A1 | 3/2007 | Royo et al. | |
| 2007/0078949 A1 | 4/2007 | Washington et al. | |
| 2007/0130601 A1 | 6/2007 | Li | |
| 2007/0136753 A1* | 6/2007 | Bovenschulte | H04H 60/31 725/46 |
| 2007/0157281 A1* | 7/2007 | Ellis | H04N 7/17309 725/134 |
| 2008/0059997 A1 | 3/2008 | Plotnick | |
| 2009/0007199 A1 | 1/2009 | La Joie | |
| 2009/0150219 A1 | 6/2009 | Headings et al. | |

OTHER PUBLICATIONS

"Home Automation Going Mainstream", http://news.designtechnica.com/news_printerfriendly4075.html, Jun. 3, 2004, 1 page.

"International Search Report PCT/US07/09339", Apr. 7, 2008, 4 pages.

(56) References Cited

OTHER PUBLICATIONS

"International Written Opinion PCT/US07/09339", Apr. 7, 2008, 9 pages.

* cited by examiner

RULES-BASED CONTENT MANAGEMENT

PRIOR APPLICATION

This application is a continuation of and claims priority to U.S. application Ser. No. 13/488,495 filed Jun. 5, 2012, by Phillips et al., entitled "Rules-Based Content Manager", now U.S. Patent Publication No. 2012/0240172, which is a continuation of and claims priority to U.S. application Ser. No. 11/408,495 filed Apr. 20, 2006 (now U.S. Pat. No. 8,209,729). All sections of the aforementioned application are incorporated herein by reference in their entirety.

FIELD

This application relates to multimedia data processing, and more specifically to techniques for rules-based content of Internet Protocol Television (IPTV) management.

BACKGROUND

Existing video on demand (VOD) collection and distribution techniques Internet Protocol Television (IPTV) often rely on manual instructions and manually initiated processes to acquire and to distribute a piece of VOD content to a target subscriber. Content is distributed to distribution sites and from the distribution sites the content is delivered to the target subscriber.

Typically, subscribers request content; the content is located at a distribution site; the content is exported to a proper media format (i.e., for IPTV systems); and the content is delivered to the local environments of the subscribers for viewing consumption. With this approach, the distribution sites may quickly become degraded resulting in poor bandwidth, poor processing, and poor storage management at the distribution sites.

Moreover, subscribers, who are identified as being of more importance to a content service provider, may not receive the preferential treatment and service that they should receive in this type of operating environment; or if they do, then the mechanism by which they receive the preferential treatment is ad hoc, manually intensive, and fraught with quality assurance problems.

Thus, techniques for more efficiently managing, packaging, and distributing VOD content for IPTV systems are desirable.

BRIEF DESCRIPTION OF DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
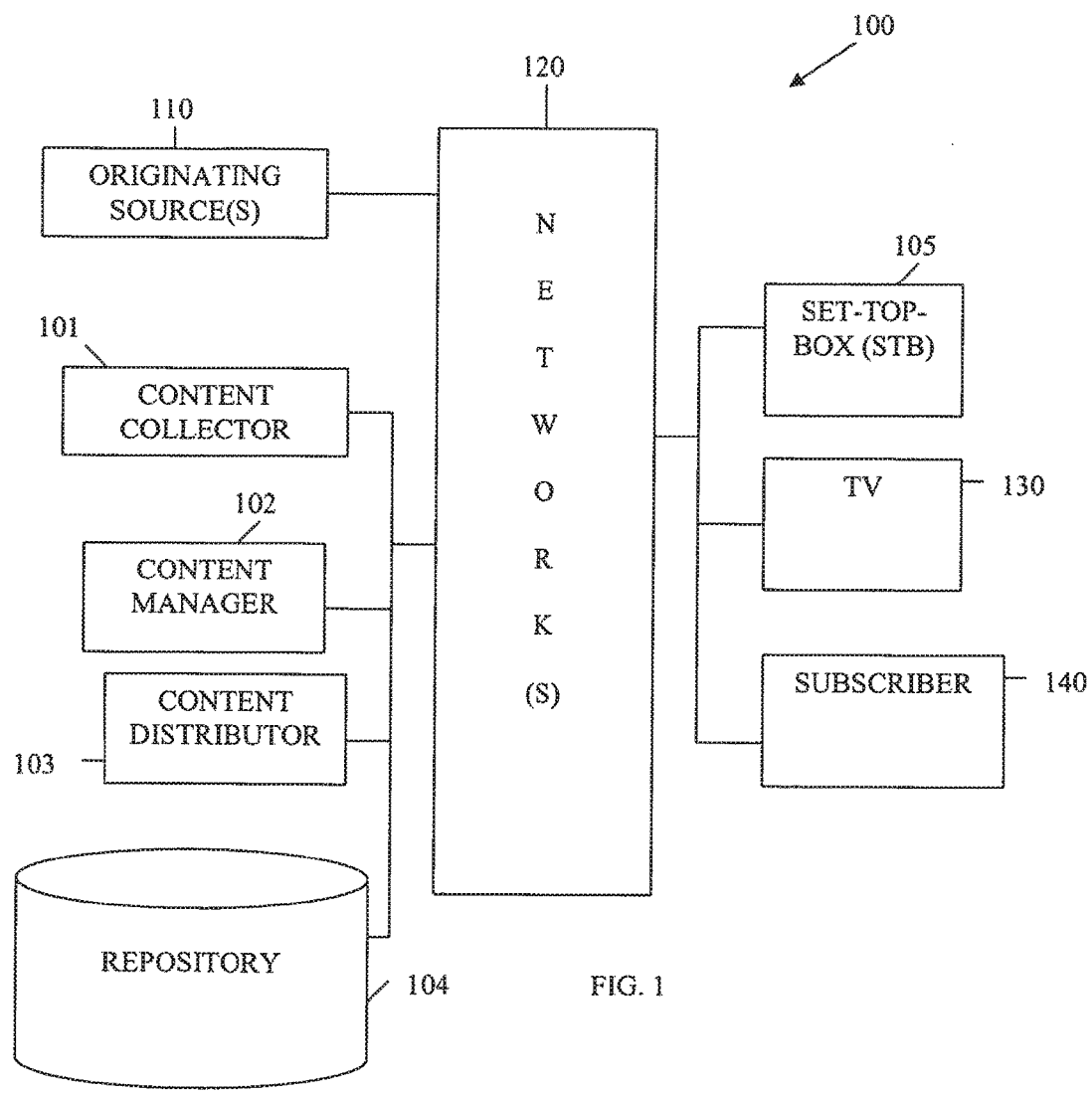
FIG. 1 is a diagram of a rules-based video IPTV on demand (VOD) content management system, according to an example embodiment of the disclosure.

FIG. 1 is a diagram of a rules-based video on demand (VOD) asset management system 100 for IPTV systems, according to an example embodiment of the disclosure. The rules-based VOD content management system 100 for IPTV systems is implemented in a machine-accessible medium and is operational over a network. The network may be wired, wireless, or a combination of wired and wireless.

The rules-based VOD content management system 100 for IPTV systems includes a content collector 101, a content manager 102, and a content distributor 103. In some embodiments, the rules-based VOD content management system 100 for IPTV systems may also include a repository 104 and/or a set-top-box (STB) 105. The components 101-105 and their interactions with one another will now be discussed in turn.

The content collector 101 is responsible for receiving content from originating sources 110. The content may be any form of video on demand (VOD) associated with archives or previously recorded video or associated with live feeds. The originating sources 110 are connected to a network 120. The content (video) may be supplied via wired, wireless, or a combination of wired and wireless networks 120. In some cases, the content is supplied on removable media, such as digital versatile diskettes (DVD's), memory sticks, compact disks (CD's), etc. and uploaded to the network 120, such that the content collector 101 becomes aware of it.

The content collector 101 may also assign a unique content identifier to the content collected. In some embodiments, the identifier is a combination of an identifier for the provider of the content and a title of the content. The content is also acquired by the content collector 101 with metadata. The metadata includes a variety of information, such as but not limited to, a category for the VOD content (e.g., family, sports, kids, adult, etc.), descriptive information for the VOD content, perhaps indexing information for scenes embedded within the VOD content, identifiers for the VOD content provider, identifiers for the originating source 110, identifiers or information for licenses for the VOD content, data format type, length or size of VOD content, and the like. The content collector 101 acquires the VOD content or detects it when it appears on the network 120 or within a repository 104.

The content manager 102 organizes and prepares the VOD content for distribution to target subscribers 140 in response to business rules. Business rules are policies or conditions that the content manager 102 enforces and evaluates for each piece of VOD content. The business rules may be identified or some current subset identified for processing in response to a unique identifier for a piece of VOD content, a data format type of the VOD content, a category for the VOD content, an identifier for an originating source 110 of the VOD content, an identifier for a provider of the VOD content, and/or various combinations of some or all of these.

Moreover, the business rules may be processed by the content manager 102 on all of the VOD content, on a specific piece of VOD content, or on selective and statically or dynamically determined groupings of the VOD content. So, business rules may be locally or globally enforced. The business rules drive the processing of the content manager 102 and the content manager 102 processes the VOD content in response to the business rules by distributing the VOD content, organizing the VOD content, prioritizing the VOD content, updating the VOD content, and/or generating reports about different aspects of the VOD content.

The content manager 102 facilitates rules-based automated movement of the VOD content through the rules-based VOD content management system 100 or sub portions of the rules-based VOD content management system 100 for IPTV systems.

The business rules may drive the processing of the content manager 102 to perform a variety of processing, such as but not limited to, validation of and correction of metadata errors in the metadata that accompanies the VOD content, automated deletion of VOD content, automated movement of VOD content to network 120 edge devices (such as the TV 130 via the content distributor 103 discussed below), error notifications, grouping of VOD content for bulk processing, versioning of the VOD content, configuration of the VOD content, maintenance of the VOD content, indexing of the VOD content, fine grain security and/or coarse grain security, customized reporting, overrides to immediately perform some action on a piece of VOD content (such as deletion in cases where the VOD is corrupted or pirated, etc.), prioritizing queues for VOD content delivery, and many other types of processing. In fact, any type of processing that a service provider may desire to perform on VOD content can be achieved via a defined business rule and used to drive the processing of the content manager 102 to achieve that desired business rule.

In an embodiment, the content manager 102 may also be used to selectively update or correct a portion of the metadata for a piece of VOD content in response to the business rules. Moreover components or pieces of the VOD content may be modified or updated by the content manager 102. So, a metadata file could be replaced without replacing the corresponding media files associated with the VOD content. Art within the VOD content may also be selectively replaced or updated. Metadata may also include licensing strictures and may be customized by the content manager 102 for delivery to particular subscribers 140 or collections of subscribers 140 that have such licenses. Thus, the content manager 102 may customize the VOD content for target subscribers 140.

Once the content manager 102 determines that a particular piece of content or bulk or selective groupings of content are ready for distribution and delivery to a subscriber 140, the content manager 102 notifies the content distributor 103.

The content distributor 103 is responsible for delivering the VOD content over the network 120 in data formats and using network protocols expected by devices (e.g., STB 105 and TV 130) specific to a target subscriber 140. The content distributor 103 may also use business rules to alter, optimize, and manage that delivery or distribution process. For example, suppose a specific subscriber 140 is paying for a premium delivery using a higher bandwidth. This may be encapsulated in a business rule that the content distributor 103 conforms to during delivery of VOD content to that subscriber 140.

The content distributor 103 may also deliver VOD content in a variety of novel manners. For example, suppose a specific piece of VOD content has been requested by multiple subscribers 140 and each of these subscribers 140 are scheduled or receive the VOD content via a business rule at roughly the same date and time. In this example, the content distributor 103 may multicast the desired piece of VOD content to each of the selective grouping of subscribers 140 at the same time over the network 120.

Conventionally, delivery is achieved via a peer-to-peer (P2P) (unicast) arrangement; and although this delivery mechanism is still available as one option with the rules-based VOD content management system 100 for IPTV systems, the rules-based VOD content management system 100 is not limited to P2P delivery, such that in some cases, where it is advantageous or dictated to do so, different mechanisms such as multicast and/or broadcast may be used.

Thus, the content distributor 103 is responsible for ensuring that the VOD content is optimally delivered to its target subscriber(s) 140 or for ensuring that the VOD content is delivered via a mechanism and in a manner dictated by the business rules.

It should also be noted, that although the content collector 101, content manager 102, and content distributor 103 are shown as separate entities with separate delegated duties that these entities may logically function as a single service. So, the architecture depicted is shown for purposes of illustration only, since more components or less components or entities may be used without departing from the teachings presented herein.

According to an embodiment, the rules-based VOD content management system 100 for IPTV systems may also include a repository 104. The repository 104 may be a single data base, a plurality of data bases organized as a data warehouse, a directory, a collection of directories, a mass storage device or devices, and the like. The repository 104 houses the VOD content. The content manager 102 decides the structure of the VOD content within the repository 104 and when or if specific VOD content is to be removed from the repository 104. Further, the VOD content may exist in a variety of formats within the repository 104 that require conversion and processing before the VOD content is ~n ail acceptable consumable format.

In yet another embodiment, the rules-based VOD content management system 100 for IPTV systems includes a STB 105 connected to the network 120 and accessible to the content distributor 103 and/or the content manager 102. The STB includes software or services for receiving VOD content from the content distributor 103 in response to interactions with a subscriber 140. So, a subscriber 140 uses an input selection device, such as a remote associated with a TV 130 and/or the STB 105 and selects a piece of VOD content for delivery and viewing. The STB 105 and its services notify the content manager 102 over the network 120, and the processing of the content manager 102 and the content distributor 103 kick in to deliver the selected VOD content to the STB 105 of the subscriber 140 for viewing on the TV 130. Again, it is the business rules that dictate when and how the subscriber 140 receives the VOD content. Premium subscriptions may dictate business rules that bump deliveries of other content so that the subscriber 140 nearly instantaneously receives the desired VOD content.

One now appreciates how VOD content may be centrally collected, managed, and distributed to subscribers 140 over one or more networks 120 by associating and enforcing business rules with the VOD content. The business rules may be associated with the VOD content, the subscribers 140, the content providers, the networks 120, or various combinations of these entities. Furthermore, the business rules may be local or fine grain and other business rules may be global or coarse grain.

Figure 2:
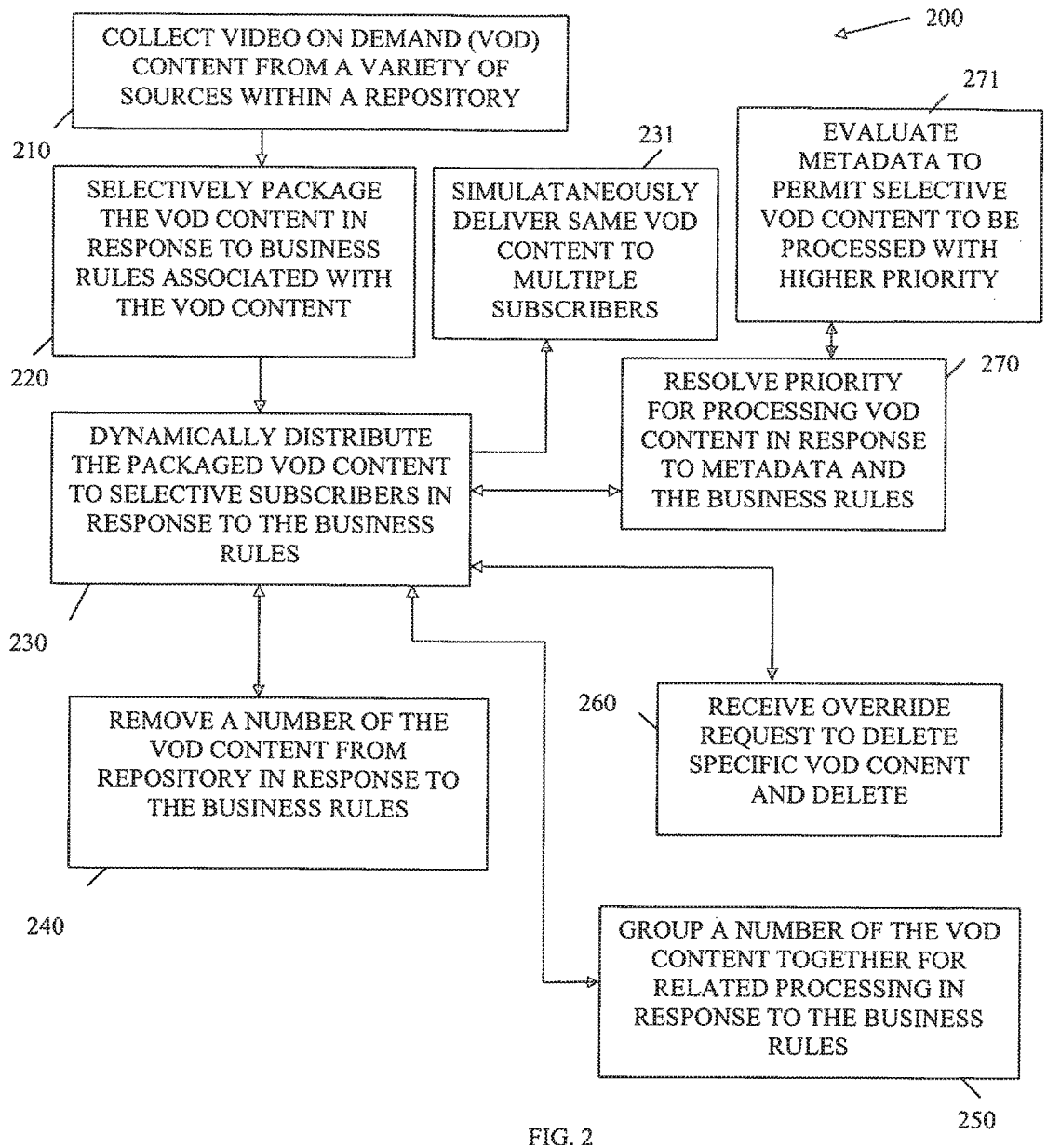
FIG. 2 is a diagram of method for rules-based management of VOD content for IPTV systems, according to an example embodiment of the disclosure.

FIG. 2 is a diagram of method 200 for rules-based management of VOD content, according to an example embodiment of the disclosure. The method 200 (hereinafter referred to as "VOD content management service") is implemented in a machine-accessible and readable medium and is operational over a network. The network may be wired, wireless, or a combination of wired and wireless. In an embodiment, the VOD content management service may be implemented in the rules-based VOD content management system 100 for IPTV systems to perform various aspects of the content collector 101, the content manager 102, and/or the content distributor 103.

Initially one or more central geographical locations are configured to house and process a repository for gathering VOD content. Each geographical location may process instances of the rules-based VOD content management system 100 for IPTV systems of the FIG. 1 and may cooperate with one another. VOD content or media assets are collected and managed in central locations. The processing of the VOD content management service represents some aspects of the management and distribution of the collected VOD content.

Accordingly, at 210, the VOD content management service collects VOD content from a variety of sources within the repository. The VOD content may be received from their originating source or from intermediate sources. Furthermore, the VOD content may be archived material or live material associated with a live feed, such as for news events or sporting events.

At 220, the VOD content management service selectively packages the VOD content in response to business rules associated with the VOD content. That is, the packaging of any particular VOD content is driven by predefined business rules or in some cases business rules included within the metadata of the VOD content (in this latter case the business rules may be dynamically defined if they are included in the metadata that accompanies the VOD content. The business rules may be associated with a particular piece of VOD content, a group or type of VOD content, a particular subscriber, a particular license, a particular content provider, and the like. Moreover, business rules may simultaneously exist and be enforced at a fine grain level and a coarse grain level for the VOD asset.

At 230, the VOD content management service dynamically distributes the packaged VOD content to selective subscribers in response to the business rules. So, a particular piece of VOD content may have been the last received and still it is the first processed and sent out to a particular subscriber if the business rules, which may also define priorities, indicate that it is appropriate to do so.

The business rules automate and drive the processing. The manner in which the VOD content is packaged and the manner in which it is injected and pushed through the network is driven by the business rules. For example, a business rule for a particular piece of VOD content may indicate that it is to be packaged with other VOD content, such as the three movies of the Lord of the Rings Trilogy.

Moreover, a single piece of VOD content may actually be requested by multiple subscribers. In the past, a P2P communication was used to deliver the VOD content to each of the subscribers. However, with the teachings presented herein a business rule may optimize the processing of the von' content management service and improve its overall efficiency by simultaneously delivering the same VOD content to multiple subscribers, as depicted at 231. So, the VOD content management service may utilize multicasting techniques for delivery or distribution of the VOD content in addition to P2P techniques. Broadcasting techniques may also be used.

According to an embodiment, at 240, the VOD content management service may remove a number of the VOD content from the repository in response to the business rules. That is, the lifespan of the VOD content within the repository may also be driven by business rules enforced and evaluated by the VOD content management service.

In yet another processing scenario, at 250, the VOD content management service may group a number of the VOD content together for related processing in response to the business rules for purposes of conforming to licensing or for purposes of efficiency. So, all content related to a certain provider or in a certain category (e.g., family, adult oriented, etc.) may have similar processing performed and this processing may be hatched for efficiency such that the similar items process together.

In another embodiment, at 260, the VOD content management service may support emergency override instructions to delete specific VOD content. So, if a piece of VOD content was inadvertently released before its scheduled release date and it is within the repository and being requested by subscribers, an administrator with the proper authority may inject an emergency override instruction to have that VOD content removed or deleted throughout the entire network and repository.

At 270, VOD content may also be processed according to a defined priority. The priority may be defined within the business rules and/or the metadata of the VOD content. So, the frequency with which VOD content is processed and pushed through to subscribers may be a function of the VOD content's assigned priority and the priority may be resolved dynamically in response to evaluation of metadata information, at 271, or may be resolved statically in response to predefined and set priority values in the business rules. Various quality of service algorithms may also be used to ensure that each piece of VOD content receives at least some processing time and is not entirely ignored because of lower priorities. Moreover, each piece of VOD content may have minimal delivery requirements, such that the VOD must be delivered and processed by some set time frame or date.

Figure 3:
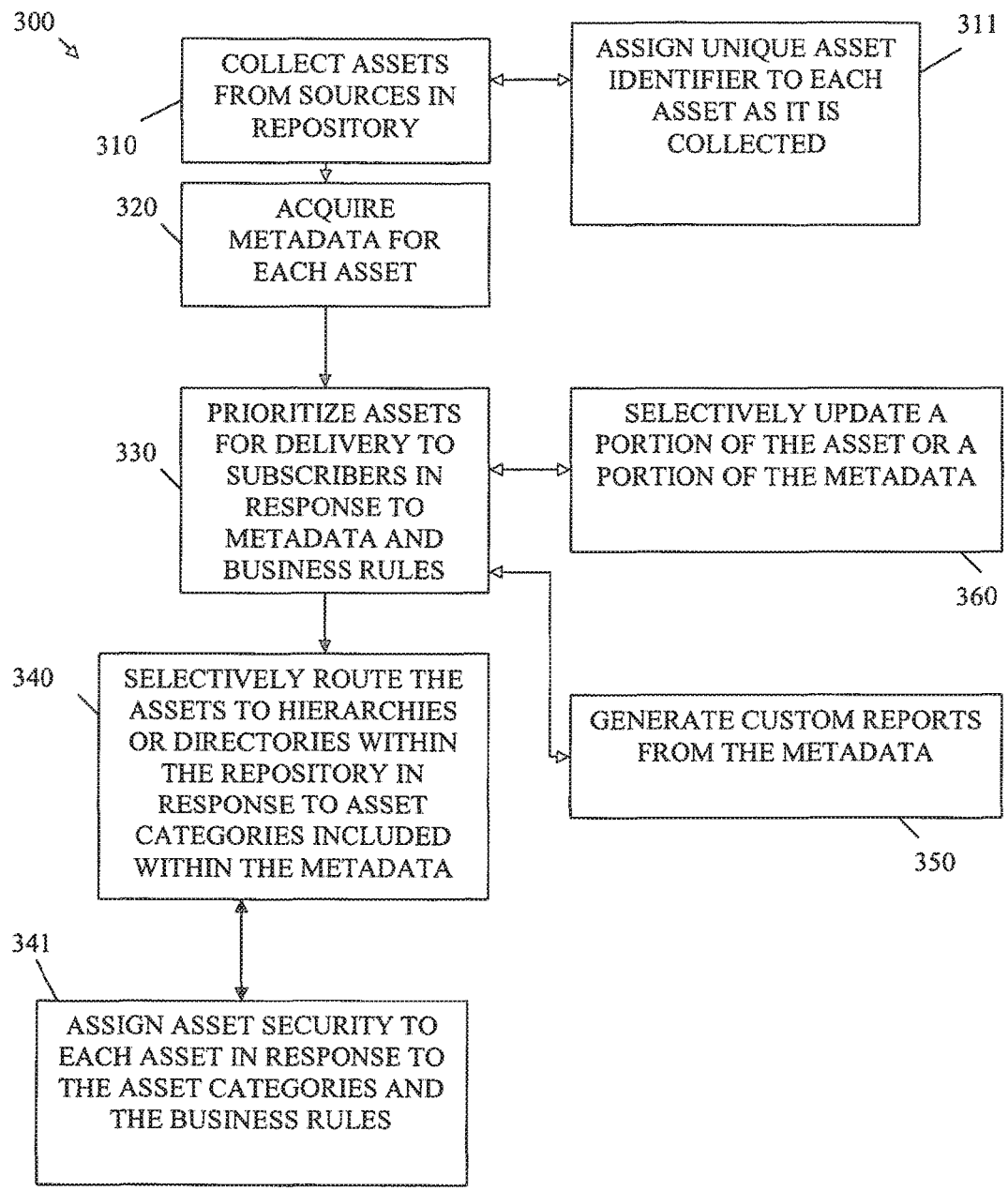
FIG. 3 is a diagram of another method for rules-based management of VOD assets, according to an example embodiment of the disclosure.

FIG. 3 is a diagram of another method 300 for rules-based management of VOD assets, according to an example embodiment of the disclosure. The method (hereinafter referred to as "VOD asset management service") is implemented in a machine-accessible and readable medium and is operational over a network. The network may be wired, wireless, or a combination of wired and wireless. The VOD asset management service presents a different perspective with different aspects for the processing depicted above with respect to the method 200 of the FIG. 2.

The VOD asset management service refers to the term asset instead of content. An asset may be any piece of media that a content provider desires to track or manage. Thus, an asset may be slide shows, video (live or archived), images, music, a real-time video conference, and the like. So, although the phrase VOD asset is used with video in it, the phrase is not intended to be so limited. The point is that any media asset that is to be delivered on demand to a subscriber or user over a network is or may be considered a VOD asset.

At 310, the VOD asset management service collects assets from a variety of originating sources in a repository. The originating sources may be a live feed from a television camera or a network transmission of an archive asset. It is also noted that the VOD asset management service may retain some assets for periods of time defined by business rules, such that when a subscriber makes a request for some asset that asset may already exist within the repository and may not have to be proactively acquired from an originating or archived source.

At 311, the VOD asset management service assigns a unique asset identifier to each asset as it is collected and placed in the repository. This asset identifier permits the assets to be tracked, located, and managed within the repository. In some cases, the metadata of an asset may carry a unique asset identifier. In other cases, the metadata may be used by the VOD asset management service to derive or generate a unique asset identifier for an asset.

At 320, the VOD asset management service acquires the metadata for each asset. That is, each asset includes descriptive and control information in a separate file or segmented within the same file as the asset. The VOD asset management service strips the metadata or acquires it from a different location or communication with the originating source and inspects the metadata. According to an embodiment, the metadata may be normalized into a common processing format, such as but not limited to extensible markup language (XML), and others.

At 330, the VOD asset management service prioritizes the assets collected for delivery to target subscribers in response to the evaluated metadata and business rules. Thus, an asset is not necessarily processed through the repository to a target subscriber based on a first-in first-out scenario, which is conventionally how it is typically done. In fact, assets are processed in prioritized and organized manners based on metadata information and business rules. So, an asset associated with a live event such as a dramatic news story related to a catastrophe may be pushed through the repository and multicast over the network to subscribers out of turn. Moreover, as another example, an asset associated with a premium subscriber may get pushed through the repository more rapidly. A license may also dictate priority and the license may be identified or embedded within the metadata and/or business rules.

According to an embodiment, at 340, the assets may be selectively routed to custom hierarchies or directories within the repository in response to categories included within the metadata. So, an asset associated with adult oriented material may include an identifier for adult rated in the metadata and a business rule may drive the VOD asset management service to route this type of asset to a specific location or hierarchy within the repository. Such a location may include increased security or controls. Correspondingly, at 341, the VOD asset management service may also assign asset security to each asset in response to the asset categories and/or the business rules.

At 350, the VOD asset management service may also generate or produce custom reports based on the assets and their metadata. There reports may provide listings or usage patterns for specific categories of assets or for specific dates or times of the day. In fact, any desired report may be generated and produced in response to business rules at selective time frames or upon the happening of an event. Alternatively, reports may be generated on demand based on instructions received from administrators using a graphical user interface (GUI) to interact with the VOD asset management service.

In an embodiment, at 360, the VOD asset management service may also selectively update a portion of an asset or a portion of its metadata. So, if an attribute within the metadata includes an expiring date, that date may be reset with the proper authority and updated by the VOD asset management service to the asset's metadata. The VOD asset management service may also insert a specific advertisement into a specific location of an asset in response to business rules related to geography. So, a Mexican product for a Mexican subscriber may appear in a scene of a movie and an entirely different product for an American subscriber may appear in the same scene of the movie. Again, this may be driven by business rules, licenses identified and embedded in the business rules, and the like.

Figure 4:
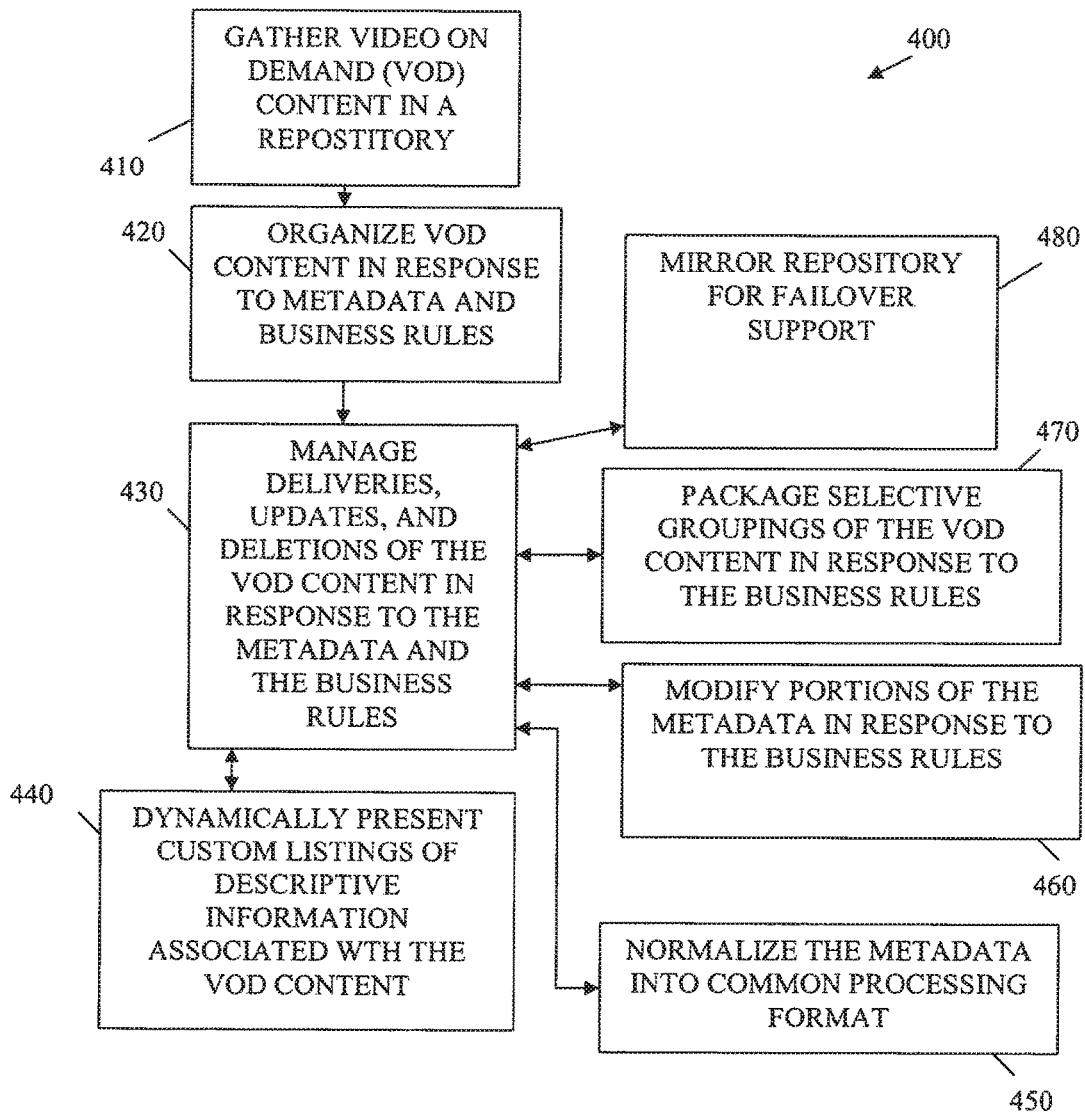
FIG. 4 is diagram of yet another method for rules-based management of VOD content for IPTV systems, according to an example embodiment of the disclosure.

FIG. 4 is diagram of yet another method 400 for rules-based management of VOD content, according to an example embodiment of the disclosure. The method 400 is implemented as instructions within a machine-accessible medium. The instructions when accessed by a machine perform the processing depicted in FIG. 4. The processing presents another alternative to the aspects presented above with respect to the methods 200 and 300 of the FIGS. 2 and 3.

The instructions may be implemented on a removable medium and subsequently interfaced to a machine where the instructions are uploaded within the machine and processed. Alternatively, the instructions may be prefabricated within memory or storage of the machine and loaded for execution when the machine is initiated or booted. In still another arrangement, the instructions may be downloaded from a network storage location or other network machine to a target machine on the network and processed. In yet another situation, the instructions may be remotely processed over a network on one machine at the instruction and on behalf of another different network machine.

At 410, the instructions gather VOD content in a repository. The VOD content may be uploaded from removable media into the repository, streamed to the repository over a network, or downloaded to the repository over a network. In some cases, security may be enforced to ensure that the content is who it purports to be from and is what it purports to be. Any security utilizing digital signatures, encryption, keys, certificates, and the like may be used.

At 420, the instructions organize the VOD content in response to metadata associated with the VOD content and in response to business rules. The business rules are developed by the network service provider in connection with content providers, content distributors, and/or subscribers. Moreover, the business rules may be organized hierarchically, such that more than one set of business rules are applied to any given VOD content. Again, the business rules may be both fine grain and coarse grain.

At 430, the instructions are processed to actively manage deliveries, updates, and deletions of the VOD content in response to the metadata and the business rules. Examples of this processing have been provided in great detail above with respect to the system 100 of the FIG. 1 and the methods 200 and 330 of the FIGS. 2 and 3.

For example, at 440, the instructions may dynamically present custom listings of descriptive information associated with the VOD content. So, as an example, a custom listing showing all subscribers the viewing The Rookie during the World Series may be produced as a custom report and presented as a listing within a GUI or within a specific data format, such as but not limited to post document format (PDF), Excel®, and others. The format of the custom listings and the frequency and particulars of the custom listings may be driven my profiles, configuration parameters, real-time instructions or parameters, and/or the business rules.

As another example, at 450, the instructions may normalize the various different data formats and structures associated with metadata of different VOD content into a common processing format, such as XML. This permits the metadata to be readily evaluated and processed by the instructions or other services. Global business rules may define the normalization schemas and formats.

In yet another example, at 460, the instructions may modify selective portions of the metadata of the VOD content in response to business rules or may even actually selective modify portions or scenes within the VOD content. Again, examples of this situation and its usefulness were discussed above.

At 470, the instructions may also selectively package groupings of the VOD content in response to the business rules. So, a subscriber may package sets or subsets of VOD content to be delivered as a group. The instructions may also group VOD content on its own in response to global business rules.

In another embodiment, at 480, the entire repository of the VOD content may be mirrored for failover support. In this manner, if the instructions or the repository fail or have network connectivity problems a mirrored site having another instance of the instructions processing may seamlessly take over and the subscribers may be unaware of the problems and service continues unabated.

Figure 5:
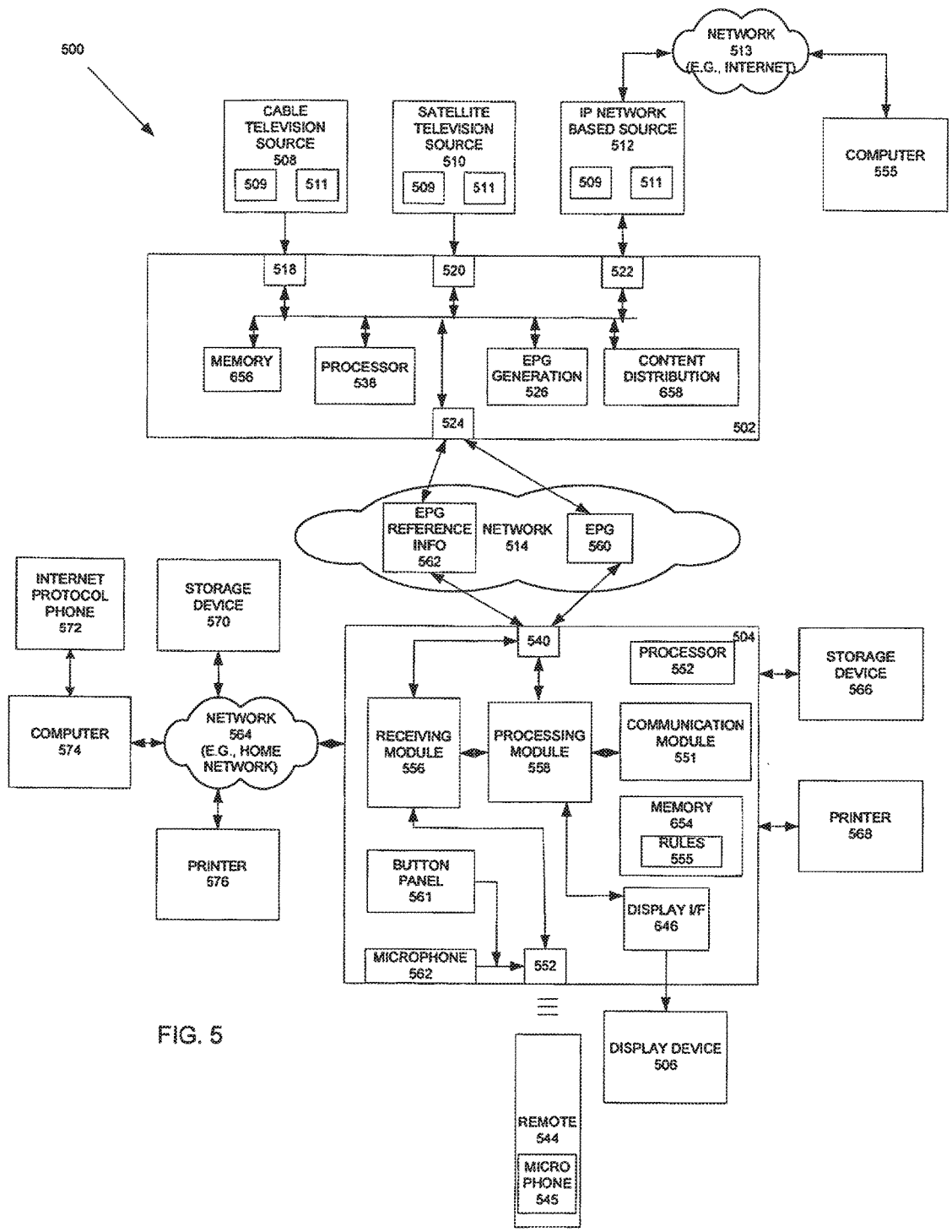
FIG. 5 is a diagram of an example network architecture for devices, machines, services, systems, and instructions to interact and perform any one or more of the methodologies discussed herein, according to an example embodiment of the disclosure.
Figure 6:
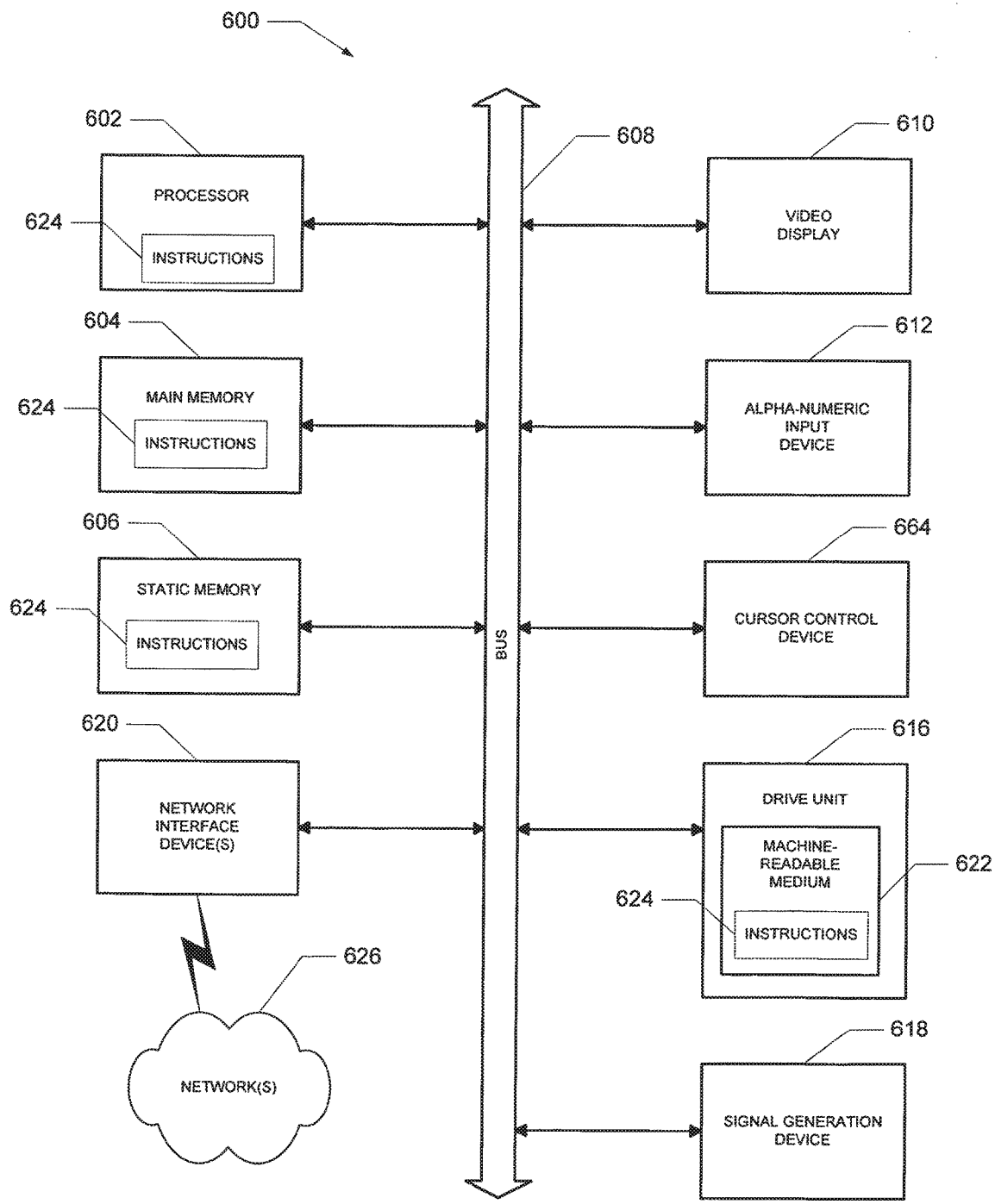
FIG. 6 is a diagram of an example machine architecture within which a set of instructions for causing the machine to perform any one or more of the methodologies discussed herein may be executed, according to an example embodiment of the disclosure.

FIGS. 5-6 are now presented for purposes of providing an example network architecture and machine architecture for which devices can interact to achieve the teachings and techniques presented herein. This layout and configuration is presented for purposes of illustration only and is not intended to limit the embodiments presented herein.

FIG. 5 is a diagram of an example network architecture 500 for devices, machines, services, systems, and instructions to interact and perform any one or more of the methodologies discussed herein, according to an example embodiment of the disclosure.

FIG. 5 may also be viewed as an example multimedia distribution system 500 that is implemented in accordance with at least one embodiment of the present disclosure. As shown, the system 500 includes a multimedia content provider 502, a set-top box 504, a display device 506, a plurality of multimedia content sources, such as cable television source 508, satellite television source 510, and IP network-based source 512.

In the illustrated embodiment, the content provider 502 and the set-top box 504 are connected via a network 514, where the network 514 can include a cable television distribution network, a satellite distribution network, a broadcast television distribution network, a data packet-based computer network (e.g., an Ethernet network), and the like. Likewise, the content sources 508, 510, and 512 may be connected via one or more networks to the content provider 502.

As shown, the content provider 502 can include one or more interfaces 518, 520, and 522 to interface with the content sources 508, 510, and 512, respectively, and an interface 524 to interface with the set-top box 504 via the network 514. The interfaces 518, 520, 522, and 524 may include any of a variety of interfaces, such as a coaxial cable interface, a wireless interface for receiving satellite or broadcast transmissions, or a data packet network interface, such as an Ethernet interface or a router. The IP Network based source 512 is shown to be connected to a computer 515 over a network 513 (e.g., Internet) thereby providing a communication path between a user operating the set-top box 504 and a user operating the computer 515. The content provider 502 further may include an EPG generation module 526 and a multimedia content distribution module 528. The modules 526 and 528 may be implemented as software, hardware, firmware, or combinations thereof. To illustrate, the content provider 502 may include a memory 536 (e.g., static random access memory (SRAM)) and one or more processors 538, where the modules 526 and 528 may be implemented in part or in whole as executable instructions stored in the memory 536 and executed by the processor 538 to perform the techniques described herein.

As also shown, the set-top box 504 may include an interface 540 for interfacing with the content provider 502 via the network 514, a control interface 542 to receive user input and commands, (e.g., via a remote control 544, a button panel 561, a microphone 562) and a display interface 546 to interface with the display device 506. The interface 540 may include any of a variety of appropriate interfaces, such as a coaxial cable interface, a wireless interface to send and receive wireless transmissions, or a data packet-based network interface, such as an Ethernet interface. The control interface 542 may include any of a variety of interfaces, such as an infrared interface, a wireless interface, or the button panel 561. The remote control 544 is shown to include a microphone 545 for receiving voice commands and the set-top box 504 is also shown to include a microphone 562 for receiving voice commands.

The set-top box 504 is further shown to be connected to a storage device 566 (e.g., hard disk, compact disk, floppy, universal serial bus key, etc.) for storing files, a printer 568 for printing files, and a network 564 (e.g., home network). The network 564, in one embodiment, may connect the set-top box 504 to a computer 574 that is connected to an internet protocol phone 572, a storage device 570 for storing electronic files, and a printer 576. The set-top box 504 further may include a processing module 558, a receiving module 556, and a communication module 551. The processing module 558, receiving module 556, and communication module 551 may be implemented as hardware, software, firmware, or combinations thereof. To illustrate, the set-top box 504 may include a memory 554 and one or more processors 552, where one or both of modules 548 and 550 are implemented as executable instructions stored in memory 554 and executed by the processor 552 to implement techniques described herein. The memory is further shown to include rules 555 that may be utilized to control the use of images that may be captured from content that is displayed on the display device 506. For example the rules 555 may embodied as a digital rights management license that maybe distributed with content from the content source 508, 510, and 512. As is well known in the art, the license may include rules 555 that may restrict the use of the associated content.

In a particular embodiment, the content provider 502 receives data representative of multimedia channels from each of the different content sources 508, 510, and 512, and provides data representative of at least a subset of the multimedia channels to the set-top box 504 for processing and display at the display device 506 and/or output via an audio device (not shown). In one embodiment, the content provider may include a content module 509 that communicates data that includes content and a control module 511 that may communicate data that includes control information (e.g., digital license) that may include a rule that restricts the use of associated content. Moreover, in a particular embodiment, the content provider 502 may provide data representative of an electronic programming guide (EPG) 560 to the set-top box 504 for processing by the processing module 558 and for navigation by a user via the control interface 542 and the processing module 558. As described herein, the EPG 560, in one embodiment, represents a unified EPG including listings for the multimedia channels provided by two or more content sources that provide multimedia channels to the content provider 502. To illustrate, in a particular embodiment, the EPG 560 represents a navigable program guide or user interface whereby a user, via the remote control 544 or other input device, can direct the processing module 550 to navigate between multimedia channels by selecting an icon or other graphical representation of the desired channel as represented by a graphical display of the EPG 560. The EPG 560 may combine representations of all of the multimedia channels from different content sources in a single list or different lists for different content sources may be displayed concurrently by the EPG 560. Moreover, multimedia channels may be organized within the EPG 560 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

FIG. 6 is a diagram of an example machine architecture within which a set of instructions for causing the machine to perform any one or more of the methodologies discussed herein may be executed, according to an example embodiment of the disclosure.

Accordingly, FIG. 6 shows a diagrammatic representation of machine in the example form of a computer system 600 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include solid-state memories, optical and magnetic media.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A server, comprising:
a processing system including a processor; and
a memory storing executable instructions that, when executed by the processing system, perform operations comprising:
storing in a repository video on demand content, provided by a plurality of sources, along with metadata associated with the video on demand content, wherein the metadata comprises a data format type, a category, an index scene, and an identifier of the video on demand content, wherein the repository is organized in hierarchies according to the category included within the metadata;
assigning different security to the video on demand content in the repository according to a location in the hierarchies;
retrieving business rules embedded within the metadata, wherein the business rules control processing and delivery of the video on demand content through a system and include a release date for the video on demand content, wherein the control of the processing and delivery of the video on demand content comprises fine grain security, coarse gain security, customized reporting, and priority queuing for the video on demand content;

selectively packaging the video on demand content in response to the business rules and the metadata to generate packaged video on demand content;

distributing the packaged video on demand content from the repository to devices selected via multicasting according to the business rules embedded within the metadata;

resolving a priority for processing the packaged video on demand content based on a quality of service parameter, the metadata, the business rules, and a license embedded within the metadata, wherein the license describes the priority;

determining that a portion of the video on demand content was released before the release date;

deleting from the repository, responsive to emergency override instructions to the processing system from an administrator, the portion of the video on demand content that was released before the release date;

grouping a portion of the packaged video on demand content together for related processing according to the business rules;

detecting a listing of an event in the business rules, wherein the event is related to the packaged video on demand content;

generating a customized report listing a number of subscribers for the packaged video on demand content responsive to detecting the listing of the event; and mirroring the repository to a mirrored site to provide failover support, wherein the mirrored site is a source of the packaged video on demand content in an event that the repository is incapable of continuing an in-process distribution of the packaged video on demand content.

2. The server of claim 1, wherein the operations further comprise distributing the packaged video on demand content from the mirrored site in the event that the repository becomes incapable of continuing the in-process distribution of the packaged video on demand content.

3. The server of claim 2, wherein the distributing the packaged video on demand content from the mirrored site is performed such that a viewer would not be aware that the packaged video on demand content was being distributed from the r mirrored site rather than the repository.

4. The server of claim 2, wherein the repository becomes incapable of continuing the in-process distribution due to a network connectivity problem.

5. The server of claim 1, wherein the mirroring comprises mirroring all of the repository.

6. The server of claim 1, wherein the operations further comprise packaging the video on demand content according to the business rules by indexing the video on demand content.

7. The server of claim 1, wherein the operations further comprise packaging the video on demand content according to the business rules by prioritizing the video on demand content from the plurality of sources as described by the license embedded within the metadata and as further adjusted based on a detected quality of service determined from the quality of service parameter.

8. The server of claim 1, wherein the operations further comprise evaluating the metadata to permit selected video on demand content to be exported from the repository with a higher priority than other video on demand content.

9. The server of claim 1, wherein the operations further comprise assigning a unique asset identifier to portions of the video on demand content.

10. The server of claim 1, wherein the operations further comprise filtering based on the location of the video on demand content in the hierarchies.

11. The server of claim 10, wherein the different security comprises a first security that requires confirming a source and confirming a subject matter according to a digital signature and a digital certificate.

12. A non-transitory computer-readable medium comprising executable instructions that, when executed by a processing system including a processor, perform operations comprising:

storing, in a repository, video on demand content and metadata associated with the video on demand content, wherein the metadata comprises information describing the video on demand content, wherein the repository is organized in hierarchies according to the metadata;

assigning different security to the video on demand content in the repository according to a location in the hierarchies;

retrieving business rules and a license that are embedded within the metadata, wherein the business rules control processing and delivery of the video on demand content through a system, wherein the business rules include a release date for the video on demand content;

deleting, responsive to emergency override instructions to the processing system from an administrator, portions of the video on demand content according to the metadata and the business rules when the video on demand content has been found to be released before the release date;

distributing the video on demand content to devices selected via multicasting according to the business rules embedded within the metadata;

prioritizing deliveries, updates, and deletions of the video on demand content based on a quality of service parameter and based on the metadata, the license and the business rules;

grouping a portion of the video on demand content together for related processing according to the business rules, wherein the information describing the video on demand content comprises a data format type, a category, an index scene and an identifier of the video on demand content;

detecting a listing of an event in the business rules, wherein the event is related to the video on demand content;

generating a customized report listing a number of subscribers for the video on demand content responsive to detecting the listing of the event; and mirroring the repository to a mirrored site to provide failover support, wherein the mirrored site is a source of the video on demand content in an event that the repository is incapable of continuing an in-process distribution of the video on demand content.

13. The non-transitory computer-readable medium of claim 12, wherein the operations further comprise selectively packaging the video on demand content in response to the business rules and the metadata to generate packaged video on demand content.

14. The non-transitory computer-readable medium of claim 12, wherein the operations further comprise modifying portions of the metadata in response to the business rules.

15. The non-transitory computer-readable medium of claim 12, wherein the operations further comprise distributing the video on demand content from the mirrored site in the event that the repository becomes incapable of continuing the in-process distribution of the video on demand content.

16. The non-transitory computer-readable medium of claim 12, wherein the mirroring comprises mirroring all of the repository.

17. A method, comprising:
storing, by a processing system including a processor, video on demand content and metadata associated with the video on demand content in a repository, wherein the metadata comprises information describing the video on demand content, wherein the repository is organized in hierarchies according to the metadata;
assigning, by the processing system, different security to the video on demand content in the repository according to a location in the hierarchies;
retrieving, by the processing system, business rules and a license that are embedded within the metadata, wherein the business rules control processing and delivery of the video on demand content through a system, wherein the business rules include a release date for the video on demand content;
deleting by the processing system, responsive to emergency override instructions to the processing system from an administrator, portions of the video on demand content according to the metadata and the business rules when the video on demand content has been found to be released before the release date;
distributing, by the processing system, the video on demand content to devices selected via multicasting according to the business rules embedded within the metadata;
prioritizing, by the processing system, deliveries, updates, and deletions of the video on demand content based on a quality of service parameter and based on the metadata, the license and the business rules;
grouping, by the processing system, a portion of the video on demand content together for related processing according to the business rules, wherein the information describing the video on demand content comprises a data format type, a category, an index scene and an identifier of the video on demand content;
detecting, by the processing system, a listing of an event in the business rules, wherein the event is related to the video on demand content;
generating, by the processing system, a customized report listing a number of subscribers for the video on demand content responsive to detecting the listing of the event; and
mirroring, by the processing system, the repository to a mirrored site to provide failover support, wherein the mirrored site is a source of the video on demand content in an event that the repository is incapable of continuing an in-process distribution of the video on demand content.

18. The method of claim 17, further comprising presenting, by the processing system, custom listings of descriptive data associated with the video on demand content.

19. The method of claim 17, further comprising selectively packaging, by the processing system, the video on demand content in response to the business rules and the metadata to generate packaged video on demand content.

20. The method of claim 17, further comprising distributing, by the processing system, the video on demand content from the mirrored site in the event that the repository becomes incapable of continuing the in-process distribution of the video on demand content.

* * * * *